US011773586B2

(12) United States Patent
Paradis (10) Patent No.: US 11,773,586 B2
(45) Date of Patent: Oct. 3, 2023

(54) NON-WICKING UNDERLAYMENT BOARD (71) Applicant: JOHNS MANVILLE, Denver, CO (US)

(72) Inventor: Duane Paradis, Highlands Ranch, CO (US)

(73) Assignee: Johns Manville, Denver, CO (US)

(*) Notice: Subject to any disclaimer, the term of this patent is extended or adjusted under 35 U.S.C. 154(b) by 4 days.

(21) Appl. No.: 16/893,624

(22) Filed: Jun. 5, 2020

(65) Prior Publication Data

US 2021/0381229 A1     Dec. 9, 2021

(51) Int. Cl.
*B32B 5/18*     (2006.01)
*E04B 1/66*     (2006.01)
*B32B 27/12*     (2006.01)
*B32B 5/02*     (2006.01)

(52) U.S. Cl.
CPC .............. *E04B 1/665* (2013.01); *B32B 5/022* (2013.01); *B32B 5/18* (2013.01); *B32B 27/12* (2013.01); *B32B 2307/7265* (2013.01); *B32B 2309/105* (2013.01); *B32B 2607/00* (2013.01)

(58) Field of Classification Search
None
See application file for complete search history.

(56) References Cited

U.S. PATENT DOCUMENTS

| 4,351,873 | A | * | 9/1982 | Davis | B32B 7/12 |
| | | | | | 428/317.1 |
| 4,388,366 | A | * | 6/1983 | Rosato | B32B 5/18 |
| | | | | | 428/401 |
| 4,394,411 | A | * | 7/1983 | Krull | C04B 28/005 |
| | | | | | 428/218 |
| 4,418,108 | A | * | 11/1983 | Lin | B32B 17/066 |
| | | | | | 442/370 |
| 4,637,951 | A | * | 1/1987 | Gill | D04H 5/12 |
| | | | | | 428/338 |
| 4,640,864 | A | * | 2/1987 | Porter | B32B 29/007 |
| | | | | | 156/182 |
| 4,642,950 | A | * | 2/1987 | Kelly | E04G 23/02 |
| | | | | | 52/90.2 |

(Continued)

FOREIGN PATENT DOCUMENTS

| CA | 2216026 A | * | 3/1998 | |
| CA | 2774509 A1 | * | 10/2013 | B32B 27/04 |

(Continued)

OTHER PUBLICATIONS

Machine Translation of CN-2656524-Y, Nov. 2004 (Year: 2004).*

(Continued)

*Primary Examiner* — Jeffrey A Vonch
(74) *Attorney, Agent, or Firm* — Robert D. Touslee (57) ABSTRACT

A non-wicking underlayment board and methods for forming the same. The non-wicking underlayment board includes a foam core formed of closed cell foam with reinforcement layers encapsulated within the foam core. Outer facings formed of mineral coated nonwoven fibers are positioned on opposite faces of the non-wicking underlayment panel. The non-wicking underlayment board is useful for efficient and cost effective installation of barriers and surfaces in water-resistant and waterproof environments.

13 Claims, 3 Drawing Sheets

(56) References Cited

U.S. PATENT DOCUMENTS

| | | | | |
|---|---|---|---|---|
| 4,681,798 A * | 7/1987 | Gill | ................... | D04H 1/587 428/338 |
| 4,764,420 A * | 8/1988 | Gluck | ................... | B29C 44/326 427/373 |
| 4,784,897 A * | 11/1988 | Brands | ................... | D06N 5/00 428/328 |
| 5,102,728 A * | 4/1992 | Gay | ................... | B29C 70/003 428/489 |
| 5,112,678 A * | 5/1992 | Gay | ................... | B29C 70/003 442/373 |
| 5,140,789 A * | 8/1992 | De Gooyer | ........... | A47K 3/40 4/613 |
| 5,144,782 A * | 9/1992 | Paquette | ........... | E04D 13/1687 52/14 |
| 5,314,530 A * | 5/1994 | Wierer | ................... | D06N 5/00 106/18.21 |
| 5,578,363 A * | 11/1996 | Finley | ................... | E04F 15/18 428/95 |
| 5,698,304 A * | 12/1997 | Brandon | ............ | B29C 44/065 428/215 |
| 5,717,012 A * | 2/1998 | Bondoc | ................... | C08K 7/02 524/13 |
| 5,846,462 A * | 12/1998 | Thompson | ............ | B29C 44/461 261/DIG. 26 |
| 5,891,563 A * | 4/1999 | Letts | ................... | B32B 27/34 428/140 |
| 6,030,559 A * | 2/2000 | Barry | ................... | B29C 44/332 264/273 |
| RE36,674 E * | 4/2000 | Gluck | ................... | B32B 5/18 264/45.3 |
| 6,044,604 A * | 4/2000 | Clayton | ................... | E04C 2/246 52/794.1 |
| 6,058,659 A * | 5/2000 | Astrom | ............ | E04F 15/02188 52/302.1 |
| 6,093,481 A * | 7/2000 | Lynn | ................... | B32B 33/00 428/317.9 |
| 6,306,920 B1 * | 10/2001 | Heinemann | ........... | C08G 18/482 521/131 |
| 6,341,462 B2 * | 1/2002 | Kiik | ................... | D06N 5/00 428/480 |
| 6,355,701 B1 * | 3/2002 | Soukup | ............ | B29C 44/3415 521/137 |
| 6,368,991 B1 * | 4/2002 | Horner, Jr. | ............... | E04B 1/80 442/76 |
| 6,656,858 B1 * | 12/2003 | Cahill | ................... | E04C 2/296 428/512 |
| 6,838,163 B2 * | 1/2005 | Smith | ................... | B32B 17/067 428/312.4 |
| 7,763,134 B1 * | 7/2010 | Kumar | ................... | B32B 13/12 428/317.1 |
| 8,268,737 B1 * | 9/2012 | Kumar | ................... | B32B 5/18 428/920 |
| 10,000,922 B1 * | 6/2018 | Letts | ................... | B32B 27/304 |
| 10,533,323 B2 | 1/2020 | Nielsen et al. | | |
| 2002/0012785 A1 * | 1/2002 | Leduc | ................... | B32B 5/18 428/317.1 |
| 2002/0124306 A1 * | 9/2002 | Smale | ................... | E04F 15/02 4/613 |
| 2004/0014382 A1 * | 1/2004 | MacAulay | ............ | E04C 2/296 442/16 |
| 2004/0048110 A1 * | 3/2004 | Butler | ................... | E04C 2/043 442/42 |
| 2004/0053035 A1 * | 3/2004 | Haas | ................... | B32B 5/18 264/45.4 |
| 2004/0072487 A1 * | 4/2004 | Neumann | ........... | B28B 19/0092 442/79 |
| 2005/0042436 A1 * | 2/2005 | Glorioso | ........... | B32B 5/26 428/311.11 |
| 2005/0055975 A1 * | 3/2005 | Tackett | ................... | G01N 3/08 52/741.1 |
| 2005/0097857 A1 * | 5/2005 | Mehta | ................... | E04D 12/002 52/782.1 |
| 2005/0233657 A1 * | 10/2005 | Grove | ................... | D06N 3/042 442/44 |
| 2005/0260400 A1 * | 11/2005 | Schweitzer | ............... | B32B 5/18 52/309.4 |
| 2005/0266225 A1 * | 12/2005 | Currier | ................... | D06N 7/0002 428/297.4 |
| 2006/0019568 A1 * | 1/2006 | Toas | ................... | E04B 1/80 442/381 |
| 2006/0035032 A1 * | 2/2006 | Murphy | ................... | C03C 25/465 427/372.2 |
| 2006/0096205 A1 * | 5/2006 | Griffin | ................... | E04D 3/18 52/309.4 |
| 2006/0101777 A1 * | 5/2006 | Lapointe | ............ | E04D 13/1693 52/404.1 |
| 2006/0213006 A1 * | 9/2006 | Rush, Jr. | ................... | A47K 3/40 4/613 |
| 2006/0275561 A1 * | 12/2006 | Agrawal | ................... | E04D 3/351 428/2 |
| 2006/0276093 A1 * | 12/2006 | Agrawal | ................... | B32B 5/18 442/374 |
| 2008/0124530 A1 * | 5/2008 | Paradis | ................... | E04G 23/0285 428/218 |
| 2009/0035550 A1 * | 2/2009 | Schlueter | ................... | B32B 27/12 428/312.2 |
| 2009/0110885 A1 * | 4/2009 | Paradis | ................... | E04B 1/625 156/77 |
| 2009/0155603 A1 * | 6/2009 | Zheng | ................... | B32B 17/02 428/428 |
| 2009/0277113 A1 * | 11/2009 | Taraba | ................... | E04D 13/0481 52/302.1 |
| 2009/0311932 A1 * | 12/2009 | Hughes | ................... | B32B 1/00 264/261 |
| 2010/0064613 A1 * | 3/2010 | Rykkelid | ................... | E04C 2/22 52/506.01 |
| 2011/0008629 A1 * | 1/2011 | Davidson | ................... | B32B 5/245 156/60 |
| 2011/0072736 A1 * | 3/2011 | Gullett | ................... | E04D 13/1693 52/302.1 |
| 2011/0214387 A1 * | 9/2011 | Brandt | ................... | B32B 5/18 428/218 |
| 2012/0117903 A1 * | 5/2012 | Wedi | ................... | E04C 2/288 52/309.4 |
| 2012/0125450 A1 * | 5/2012 | Krusec | ................... | E04D 13/1693 137/357 |
| 2012/0141673 A1 * | 6/2012 | Koester | ................... | B29C 44/461 427/244 |
| 2012/0177865 A1 * | 7/2012 | Zhou | ................... | E04B 1/762 428/68 |
| 2013/0029550 A1 * | 1/2013 | Seth | ................... | B32B 27/285 156/244.11 |
| 2013/0055669 A1 * | 3/2013 | Olszewski | ................... | E04B 1/14 52/794.1 |
| 2013/0143061 A1 * | 6/2013 | Zhou | ................... | B32B 3/266 428/608 |
| 2013/0164524 A1 * | 6/2013 | Letts | ................... | B32B 27/40 428/319.3 |
| 2013/0318911 A1 * | 12/2013 | Sealock | ................... | E04C 2/243 428/71 |
| 2014/0130435 A1 * | 5/2014 | Paradis | ................... | E04C 2/296 156/60 |
| 2014/0194020 A1 * | 7/2014 | Vliet | ................... | C04B 24/085 428/221 |
| 2015/0040503 A1 * | 2/2015 | Tackett | ................... | E04D 11/02 52/309.4 |
| 2015/0225881 A1 * | 8/2015 | Paradis | ................... | D04H 5/04 156/60 |
| 2015/0352806 A1 * | 12/2015 | Faotto | ................... | B32B 37/12 428/688 |
| 2016/0068648 A1 * | 3/2016 | Miller | ................... | B29C 44/352 521/146 |
| 2016/0145779 A1 * | 5/2016 | Teng | ................... | E04C 2/043 442/330 |
| 2016/0264787 A1 * | 9/2016 | Dubey | ................... | D06M 13/192 |
| 2016/0361892 A1 * | 12/2016 | Ciuperca | ................... | E04B 1/762 |
| 2017/0306628 A1 * | 10/2017 | Simonis | ................... | B32B 25/08 |
| 2017/0362835 A1 * | 12/2017 | Nielsen | ................... | B32B 7/12 |

(56) References Cited

U.S. PATENT DOCUMENTS

| | | | | |
|---|---|---|---|---|
| 2017/0368792 | A1* | 12/2017 | Faotto | B32B 5/18 |
| 2018/0361712 | A1* | 12/2018 | Nandi | B32B 37/0038 |
| 2019/0292773 | A1* | 9/2019 | Gombar | E04B 1/806 |
| 2020/0109570 | A1 | 4/2020 | Nielsen et al. | |
| 2020/0123776 | A1* | 4/2020 | Leatherman | B32B 5/08 |
| 2020/0284447 | A1* | 9/2020 | Brubaker | F24F 13/20 |
| 2020/0362553 | A1* | 11/2020 | Vairo | B32B 5/245 |
| 2021/0078310 | A1* | 3/2021 | Faotto | B32B 7/12 |
| 2021/0301439 | A1* | 9/2021 | Wu | D04H 1/4218 |

FOREIGN PATENT DOCUMENTS

| | | | | |
|---|---|---|---|---|
| CN | 2656524 Y | * | 11/2004 | B32B 27/12 |
| CN | 101220696 A | * | 7/2008 | |
| CN | 201746947 U | * | 2/2011 | |
| CN | 201874162 U | * | 6/2011 | |
| CN | 102505556 A | * | 6/2012 | |
| CN | 204826267 U | * | 12/2015 | |
| DE | 1927794 U | * | 11/1965 | |
| DE | 2713487 A | * | 9/1978 | B29C 70/00 |
| DE | 3508933 A1 | * | 10/1986 | B32B 13/02 |
| DE | 19940423 A1 | * | 4/2001 | E04B 1/762 |
| DE | 20005948 U1 | * | 8/2001 | B32B 27/32 |
| DE | 202005002358 U1 | * | 6/2005 | A47K 3/40 |
| DE | 102004023921 A1 | * | 9/2005 | E04F 15/02 |
| DE | 202007008309 U1 | * | 9/2007 | B32B 29/00 |
| DE | 202007007371 U1 | * | 10/2007 | E03F 5/0408 |
| DE | 102007003787 A1 | * | 7/2008 | B32B 5/02 |
| DE | 102007013918 A1 | * | 8/2008 | E04C 2/22 |
| DE | 102008005423 A1 | * | 7/2009 | B32B 5/022 |
| DE | 102010000600 A1 | * | 10/2010 | B32B 5/02 |
| DE | 202016004149 U1 | * | 10/2016 | E04C 2/284 |
| EP | 609721 A2 | * | 8/1994 | B29C 44/04 |
| EP | 1236566 A1 | * | 9/2002 | B28B 19/0092 |
| EP | 1582622 A2 | * | 10/2005 | B32B 27/12 |
| EP | 2083115 A1 | * | 7/2009 | B32B 5/022 |
| EP | 2230075 A1 | * | 9/2010 | D06N 7/0002 |
| EP | 2333180 A1 | * | 6/2011 | B32B 17/02 |
| EP | 3045306 A1 | * | 7/2016 | B32B 27/12 |
| EP | 3628482 A1 | * | 4/2020 | B32B 19/047 |
| FR | 2573460 A1 | * | 5/1985 | E04C 2/205 |
| FR | 2617220 A3 | * | 12/1988 | |
| GB | 2055326 A | * | 3/1981 | B32B 27/08 |
| GB | 2338682 A | * | 12/1999 | B29C 44/32 |
| GB | 2432555 A | * | 5/2007 | B29C 44/326 |
| GB | 2437370 A | * | 10/2007 | E04F 15/18 |
| GB | 2518055 A | * | 3/2015 | B32B 5/022 |
| JP | 61272138 A | * | 12/1986 | |
| JP | 01198336 A | * | 8/1989 | |
| JP | 07292877 A | * | 11/1995 | |
| JP | 09310284 A | * | 12/1997 | |
| JP | 2002086460 A | * | 3/2002 | B29C 44/32 |
| JP | 2011068117 A | * | 4/2011 | |
| JP | 2020051174 A | * | 4/2020 | E03F 5/0408 |
| KR | 741311 B1 | * | 8/2007 | |
| KR | 2013073273 A | * | 7/2013 | |
| KR | 2016031095 A | * | 3/2016 | B32B 27/12 |
| KR | 1657494 B1 | * | 9/2016 | C08L 23/10 |
| WO | WO-8300840 A1 | * | 3/1983 | |
| WO | WO-9322118 A1 | * | 11/1993 | B28B 23/0006 |
| WO | WO-9714730 A1 | * | 4/1997 | C08G 18/482 |
| WO | WO-0238879 A1 | * | 5/2002 | B32B 3/30 |
| WO | WO-03018934 A1 | * | 3/2003 | A47K 3/40 |
| WO | WO-2009051575 A1 | * | 4/2009 | B32B 15/046 |
| WO | WO-2010145928 A1 | * | 12/2010 | B28B 19/003 |
| WO | WO-2016184433 A1 | * | 11/2016 | |
| WO | WO-2021142337 A1 | * | 7/2021 | B32B 3/08 |

OTHER PUBLICATIONS

Machine Translation of EP-1582622-A2, Oct. 2005 (Year: 2005).*
Machine Translation of EP-2083115-A1, Jul. 2009 (Year: 2009).*
Machine Translation of JP-2011068117-A, Apr. 2011 (Year: 2011).*
Machine Translation of KR-2016031095-A, Mar. 2016 (Year: 2016).*
Wiyono et al., Characterization of Physical and Mechanical Properties of Rigid Polyurethane Foam, Dec. 2016, ARPN Journal of Engineering and Applied Sciences, Vo. 11, No. 24 (Year: 2016).*
Machine Translation of DE-1927794-U, Nov. 1965 (Year: 1965).*
Machine Translation of FR-2617220-A3, Dec. 1988 (Year: 1988).*
Machine Translation of JP-01198336-A, Aug. 1989 (Year: 1989).*
Machine Translation of DE-102010000600-A1,Oct. 2010 (Year: 2010).*
Machine Translation of EP-3045306-A1, Jul. 2016 (Year: 2016).*

* cited by examiner

NON-WICKING UNDERLAYMENT BOARD

BACKGROUND OF THE INVENTION

External walls of structures and internal walls where moisture is likely to contact, such as shower stalls, are typically tiled, lined with cultured marble, or covered with another durable waterproof material. The walls of the structures should be capable of preventing moisture transfer through the wall to preserve the structural integrity of the wall and prevent damage. Typical systems require specialized skills, tools, materials, and processes to install and can lead to discomfort for installers as a result of working with fiberglass mats while installing.

SUMMARY OF THE INVENTION

A non-wicking underlayment board for moisture resistant applications in commercial and residential environments. One general aspect includes a non-wicking underlayment board, including a foam core layer having a compressive strength greater than twenty pounds per square inch and a thickness in a range of between 3.175 mm (⅛ inch) to 106 mm (4 inches). The non-wicking underlayment board also includes a reinforcement layer coextensive with the foam core layer and integrally formed within the foam core layer. The non-wicking underlayment board also includes a first and second low-wick outer facing layer coextensive with and positioned on opposite faces of the foam core layer, each including mineral-coated nonwoven fibers and having a thickness in a range of between 0.15 mm (0.0059 inches) to 0.3 mm (0.0118 inches), where the mineral-coated nonwoven fibers prevent wicking of liquid and is compatible with mortar and adhesive.

Another general aspect includes a non-wicking underlayment board, including a foam core layer having a compressive strength greater than twenty pounds per square inch and a thickness in a range of between 3.175 mm (⅛ inch) to 101.6 mm (4 inches). The non-wicking underlayment board also includes a reinforcement layer coextensive with the foam core layer and integrally formed within the foam core layer. The non-wicking underlayment board also includes a first outer facing layer coextensive with and positioned on a first face of the foam core layer, the first outer facing layer including mineral-coated nonwoven fibers and having a thickness in a range of between 0.15 mm (0.0059 inches) to 0.3 mm (0.0118 inches), where the mineral-coated nonwoven fibers prevent wicking of liquid and is compatible with mortar and adhesive. The non-wicking underlayment board also includes a second outer facing layer coextensive with and positioned on a second face of the foam core layer, the second outer facing layer including mineral-coated nonwoven fibers and having a thickness of greater than 0.3 mm (0.118 inches).

Another general aspect includes a method of manufacturing a non-wicking underlayment panel, including forming a fiberglass scrim. The method also includes adhering the fiberglass scrim to a first polyester facing. The method also includes applying a mineral coating to a side of the first polyester facing opposite the fiberglass scrim. The method also includes applying a mineral coating to a side of a second polyester facing. The method also includes positioning the second polyester facing spaced apart from the first polyester facing, the side of the first polyester facing positioned opposite the second polyester facing and the fiberglass scrim facing the second polyester facing. The method also includes filling a void between the first polyester facing and the second polyester facing with a closed cell foam. Other embodiments of this aspect include corresponding devices and systems each configured to perform the actions of the methods.

DETAILED DESCRIPTION

Composite tile underlayment boards of various compositions, sizes, thicknesses and slopes are commonly used to construct waterproof and water resistant substrates for both interior and exterior applications including bathrooms, interior wet areas, exterior walls functioning as air and water barriers with bondable outer surfaces serving as substrates for exterior decorative veneers, tiles, and coatings. To construct a waterproof substrate using composite building panels, typical systems include the use of sealants, sheet membranes, liquid membranes, tapes, and other means to waterproof boards, joints, and fastener penetrations. Cementitious boards and gypsum composite boards typically require waterproofing over their entire surfaces while some foam composite boards only require waterproofing joints and fastener penetrations. For foam composite boards, joints typically require gapping with some sort of waterproofing method that prevents water wicking through the outer facing or surface of the board, especially under hydrostatic pressure. Additional steps required for waterproofing or introducing air gaps as well as additional material required increase the overall cost of a waterproof installation.

Embodiments described herein enable efficient construction of water resistant and waterproof walls and enclosures for commercial and residential applications, such as exterior walls and shower enclosures. The non-wicking underlayment board enables efficient construction of walls by providing a non-wicking and/or waterproof barrier incorporated within an underlayment board. In typical systems an underlayment board is used to enclose a wall and subsequently a non-wicking or waterproof barrier is applied on top of the underlayment board. Additional care must be taken at seams of underlayment boards to maintain non-wicking properties and ensure the wall is sufficiently water resistant. The non-wicking barrier in typical systems often includes a fiberglass mat that can cause itching or discomfort for installers as they have to work with the mat to apply it to the underlayment board. In the embodiments described herein, the non-wicking underlayment board can be easily installed because, unlike typical systems, there is little to no wicking at joints and seams of adjacent underlayment boards so underlayment boards need not be carefully spaced to prevent wicking and can instead abut one another for easier installation.

The underlayment board described herein is lightweight, non-wicking, quick to install and waterproof as defined by ASTM E331, ANSI A118.10 and ASTM D4026, Annex 2 each of which are presented in Table 1. Based on the requirements listed in Table 1, the waterproof underlayment system can resist twenty-four inches of hydrostatic pressure for at least forty-eight hours without leaking or wicking water behind the system into the wall cavity. The non-wicking underlayment board can also function as an air barrier as defined by ASTM E2178 and ASTM E2357. To ensure the underlayment board can achieve the required performance, the foam composite underlayment board is designed to minimize wicking while maintaining compatibility with all types of adhesives including mortars typically used to install ceramic, porcelain and natural stone tiles.

Table 1 below gives preferred properties for polyisocyanurate foam panels, in accordance with embodiments of the underlayment board. However, it well be understood that these properties are given as examples only, and that panels having other properties may be used.

| Shear Strength (Under conditions required in ANSI A118.10) | |
| --- | --- |
| 7 day shear strength: | >50 psi |
| 7 day water immersion shear strength: | >50 psi |
| 28 day shear strength: | >50 psi |
| 100 day water immersion shear strength: | >50 psi |
| Waterproofness; ASTM D4068/ANSI A118.10 | Pass |
| Waterproofness of Assembly (ASTM E331) | Passed, assembly (complete system) |

Figure 1:
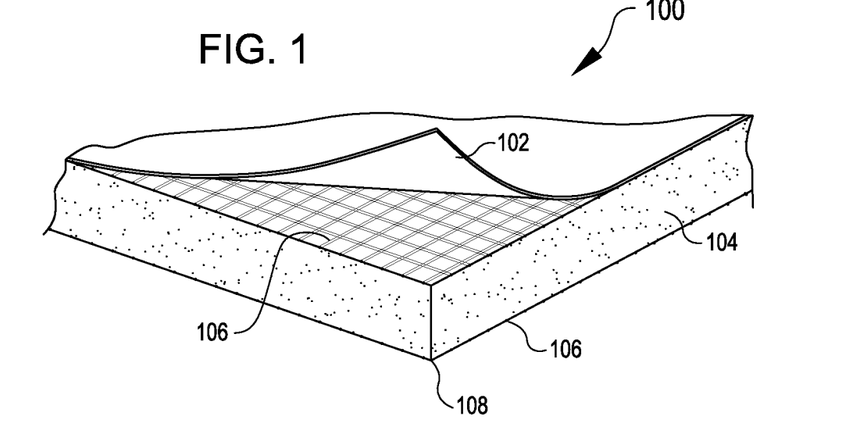
FIG. 1 illustrates a cross-section view of a non-wicking underlayment board including integral reinforcements.

Turning now to the figures, FIG. 1 illustrates a cross-section view of a non-wicking underlayment board 100 including integral reinforcements. The non-wicking underlayment board 100 is formed of a foam core 104, a first outer facing 102, a second outer facing 108, and reinforcement layers 106. The non-wicking underlayment board 100 can be provided in a thickness of between one-eighth of an inch to over four inches. The non-wicking underlayment board 100 can be provided in any suitable length or width, for example having a four foot width and an eight foot length.

Figure 4:
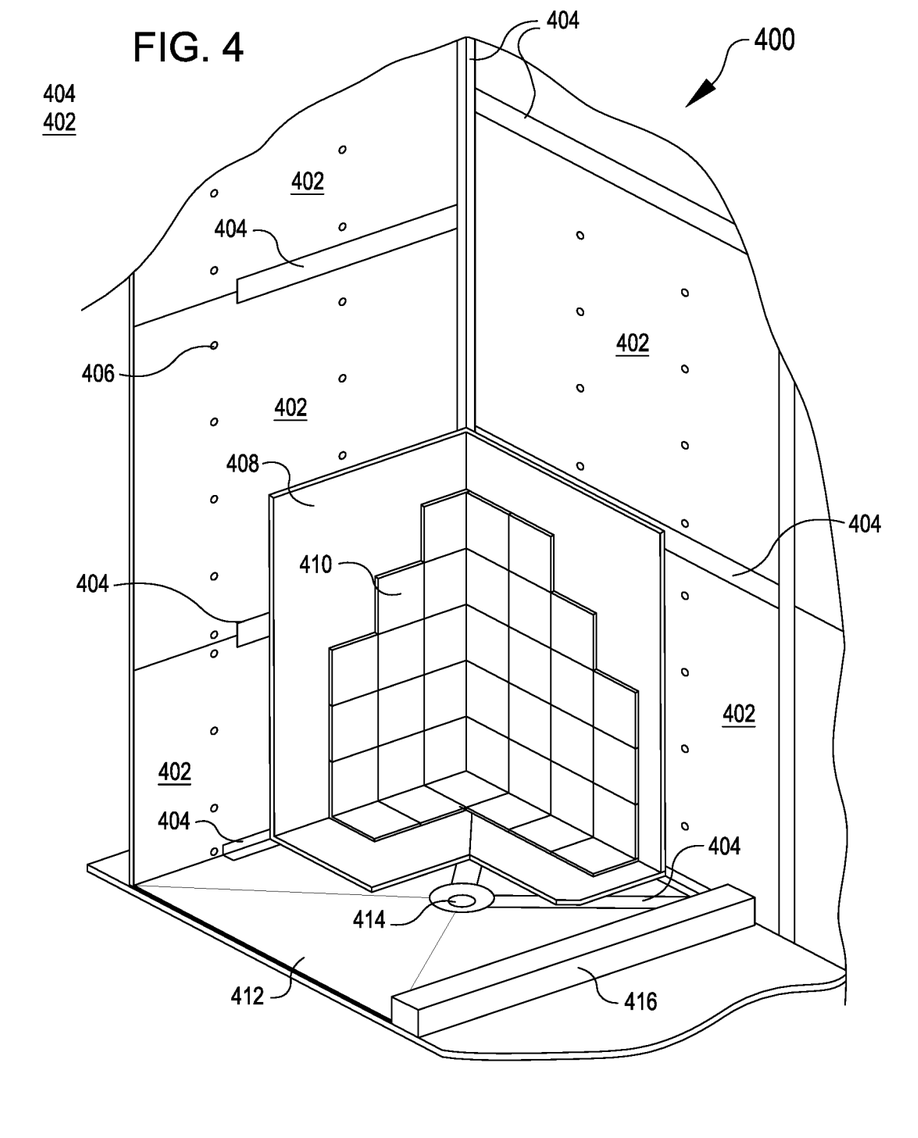
FIG. 4 illustrates an example shower installation using a non-wicking underlayment board.
Figure 5:
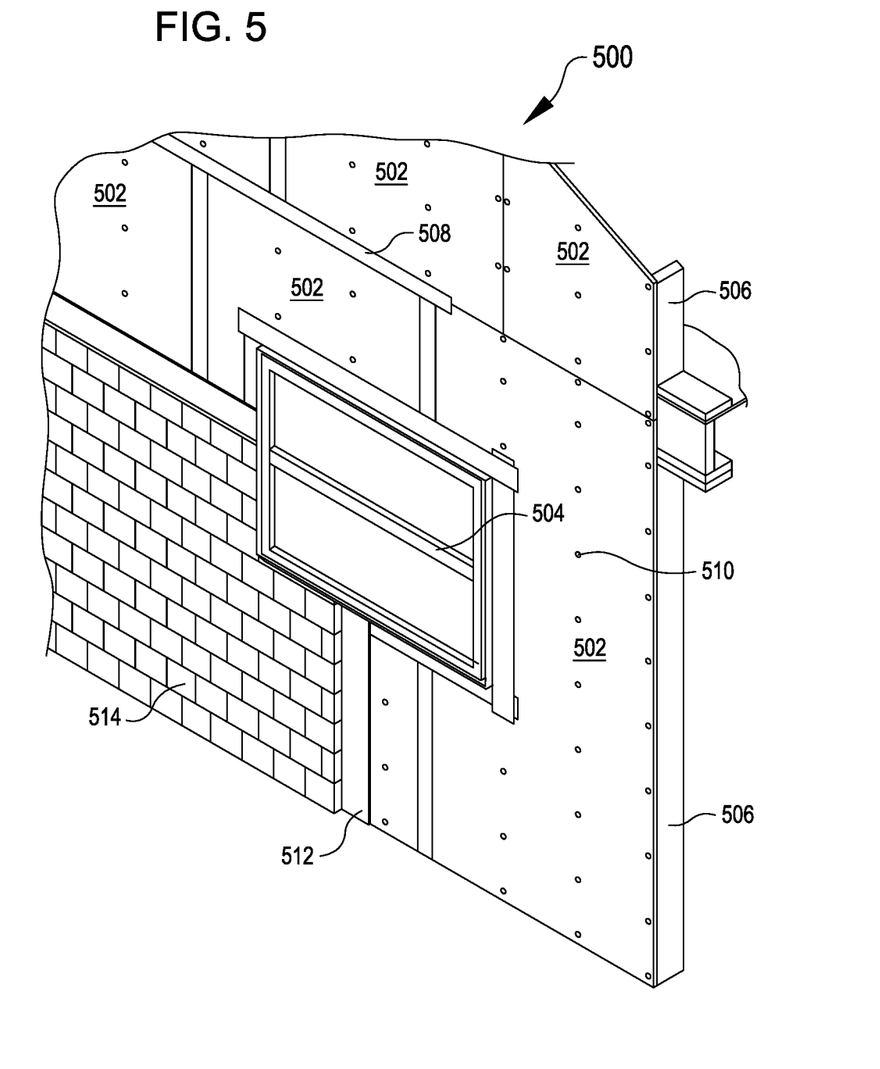
FIG. 5 illustrates an example exterior wall panel installation using a non-wicking underlayment board.

The non-wicking underlayment board 100 includes a foam core 104 formed of a closed-cell foam. The closed-cell foam can be a polystyrene, polyisocyanurate, polyurethane or other such closed-cell foam core with sufficient compressive strength for an intended use. In an example, flooring applications typically require higher compressive strengths than wall or ceiling applications. The foam core 104 may have a density of about 1.0 lb/ft$^3$ or more, for example 1.0 to 12.0 lb/ft$^3$, or preferably about 2.5 to 6 lb/ft$^3$. In an example, for vertical installations, the closed-cell foam used in the foam core 104 may have a compressive strength greater than twenty pounds per square inch (PSI) or in another example greater than two hundred PSI in order to provide sufficient stiffness and rigidity for installation directly to vertical studs of a wall structure, such as shown in FIGS. 4 and 5. Because cladding applied on top of the non-wicking underlayment board 100 is often rigid, such as tile, stone, ceramic, or other such materials, deflection of the non-wicking underlayment board can result in cracking of finished surfaces, difficulty installing larger tiles and veneers and insufficient resistance to wind loads.

On horizontal surfaces, such as flooring applications, especially where significant traffic and rolling loads are expected, much higher compressive strengths are required. For residential and light commercial applications, compressive strengths of two hundred and fifty PSI or greater is typically required to ensure the overlaying tile or cladding installation does not crack or deteriorate over time. Composite flooring materials that are more flexible and resilient may not require the non-wicking underlayment board to feature such higher compressive strengths. Other mechanical properties like flexural strength, fastener holding strength, tensile strength, shear bond strength, lateral fastener resistance and impact resistance are all improved with increasing the compressive strength of the foam core 104.

The first outer facing 102 includes a thin layer of a fiber nonwoven material saturated or coated with a mineral based coating. The first outer facing 102 has a thickness of between 0.15 mm to 0.3 mm. The fiber nonwoven material is a glass or polymeric fiber nonwoven material. The mineral based coating may be any mineral based coating useful in construction and bonding with cementitious adhesives, one exemplary mineral based coating may include magnesium oxide or limestone. In some examples, the mineral based coating may be an acrylic based adhesive. The first outer facing 102 produces a non-wicking barrier due to the lightweight nonwoven material. Additionally, the mineral based or acrylic based coating enables mortar adhesion to the first outer facing 102 but provides a low or non-wicking surface to which a tile or other such material may be adhered.

The first outer facing 102 is compatible with sealants, adhesives, and seam tapes suitable for use in various environments, including those described with respect to FIGS. 4 and 5, for example polyurethane, STPE, MS polymer, acrylic and silicone based sealants and adhesives, as well as acrylic, butyl and SBS based adhesives and seam tapes. In addition, at first outer facing 102 is compatible with thinset mortars and other tile or stone setting adhesives used to install ceramic, porcelain, natural stone, or other kinds of tile.

The second outer facing 108 may be identical to the first outer facing 102 and may include the same fiber nonwoven material and mineral based coating. In some examples, such as described in FIG. 3 below, the second outer facing 108 may be formed of a different material, include a different material, or be formed into a different thickness than the first outer facing 102. This may be advantageous for isolation of cracks or movement in a substrate beneath or behind the non-wicking underlayment board 100. The first outer facing 102 and the second outer facing 108 are shown parallel with one another. In some embodiments, the first outer facing 102 and the second outer facing 108 may be at an angle with respect to one another, for example when installing a shower pan as shown and discussed in FIG. 4.

The non-wicking underlayment board 100 includes a reinforcement layer 106 encapsulated within the foam core 104. One exemplary material that may be used for the reinforcement layer 106 is a fiberglass scrim. Other examples of reinforcing materials may include blends of polymeric and fiber glass scrim, fiber glass nonwovens, polymeric nonwovens and blends of fiberglass and polymeric nonwovens. The thickness of the reinforcement layer 106 may vary based on the strength properties of the non-wicking underlayment board 100. For example, in applications requiring greater strength and rigidity, such as beneath a tile floor where high traffic is expected, the reinforcement layer may be thicker. Additionally, the selection of material for the reinforcing layer may be based on the ultimate properties of the non-wicking underlayment board 100. For example, in applications where high fastener holding strength is needed (such as where a large load may be applied to a vertical panel, fiberglass scrim or fiberglass nonwoven reinforcing materials will provide greater fastener holding strength and flexural strength than reinforcing materials having lower tensile strengths. Conversely, if flexibility is required for a particular application, lighter weight and lower tensile strength reinforcements can be used for the reinforcement layer 106.

The reinforcement layer 106 is encapsulated within the foam core 104 such that the reinforcement layer 106 is integral with the foam core 104 as well as with the outer facings. The reinforcement layer 106 is depicted as present on both opposing faces of the foam core 104, though in some examples the reinforcement layer 106 may only be included on a single face, such as only on the same side as the first outer facing 102. The reinforcement layer 106 is encapsulated within the foam core 104 by expanding the components of the foam core 104 in a void between the first outer facing 102 and the second outer facing 108, with the reinforcement layers 106 positioned in between the outer facings. The reinforcement layers 106 are depicted adjacent and in contact with the outer facings. In some examples the reinforcement layers 106 may be positioned at varying depths within the foam core 104, for example the reinforcement layers 106 may be in the center of the foam core 104 in addition to or in place of the reinforcement layers 106 at the edges of the foam core 104.

Due to the construction of the non-wicking underlayment board 100, with the non-wicking outer facing and foam core 104 formed of closed cell foam, fastener penetrations do not require additional topical waterproofing and the non-wicking underlayment boards 100 can be tightly butted together and sealed with a wide variety of seam tapes. Because of the self-sealing fastener penetrations and the use of peel and stick seam tapes over board joints, the non-wicking underlayment board 100 enables the creation of a underlayment system that can be bonded to or tiled immediately after installation without requiring drying time for an intermediate adhesive thereby saving labor and materials. Other methods of sealing joints are also possible due to the universal compatibility of the described foam composite board with sealants, adhesive, thin set mortars and other materials commonly used for reinforcing and sealing joints between non-wicking underlayment boards 100.

Joints and gaps between adjacent non-wicking underlayment boards 100 are sealed with a suitable tape or sealant, or a combination of sealing mechanisms, producing a fully waterproof installation preferably compliant with ANSI A118.10 and IAPMO PS-106. While any workable sealants or tapes may be used, a preferred sealant is polyurethane STPE or MS polymer caulk. A preferred seam tape is 2" wide polymer-coated alkali-resistant fiber glass mesh tape 2" wide waterproof peel and stick acrylic tape. Joints may also be coated with a liquid waterproofing membrane. In some embodiments, the sealant may be GoBoard® Sealant available from Johns Manville.

Though typical or previous systems may require a gap between adjacent boards, embodiments as described herein may be positioned adjacent one another without any gap left between the boards and the installation still maintains waterproof properties.

The non-wicking underlayment board 100 is formed through a series of steps. The series of steps may be performed in the order presented below, or may be presented in a different order, as will be apparent to those with skill in the art.

The first step for forming the non-wicking underlayment board 100 is to form a scrim of fibers, such as fiberglass, polymer fibers, or other fibers as presented above. The scrim may be formed and rolled and subsequently unrolled when the non-wicking underlayment board 100 will be formed. The scrim is also coated, with an acrylic based adhesive as described herein.

The non-wicking underlayment board 100 is formed next by applying the scrim to a first outer facing 102. The first outer facing 102 is a layer of polymer fiber or glass fiber nonwovens saturated with mineral based coatings. The mineral based coating includes a ground limestone or other mineral product, an acrylic binder, additives, and water. The mineral based coating is applied at a rate of between 4 to 10 grams per square foot, or more preferably between 5 to 6 grams per square foot. In some embodiments, such as when the first outer facing 102 or the second outer facing 108 is substantially thicker, the coating application rate may increase to ensure sufficient coating of the nonwovens. The first outer facing 102 has a thickness of between 0.15 mm to 0.3 mm. The non-wicking underlayment board 100 may also include a second outer facing 108, the second outer facing may be identical to the first outer facing 102, but in some examples, such as in FIG. 3 below. The first outer facing 102 and the second outer facing 108 are formed such that the nonwovens have a weight of between 34 to 50 grams per square meter (3.2 to 4.7 grams per square foot).

The first outer facing 102 and the second outer facing 108 are spaced apart to the ultimate final width of the non-wicking underlayment board 100. The reinforcement layers 106 are positioned adjacent the first outer facing 102 and the second outer facing 108. The void between the first outer facing 102 and the second outer facing 108 may be filled with a closed cell foam to form the foam core 104. The foam core 104 is formed by mixing reactant chemicals to form the structure of the foam core 104 which sets between the first outer facing 102 and the second outer facing 108 to form the foam core 104. The foam core 104 encapsulates, partially or fully, the reinforcement layers 106, capturing the reinforcement layers 106 and bonding the layers together. In some examples, the foam core 104 may encapsulate or adhere additional reinforcement layers 106 or other layers such as impervious barriers or other such materials as part of the non-wicking underlayment board 100. The foam core 104 expanding from between the reinforcement layers 106 and the facings results in the closed cell foam penetrating into the nonwoven fibers of the facings to thereby reduce any possible wicking of moisture across the board. The non-wicking underlayment board 100 is finally cut to final size after the foam core 104 has set.

Figure 2:
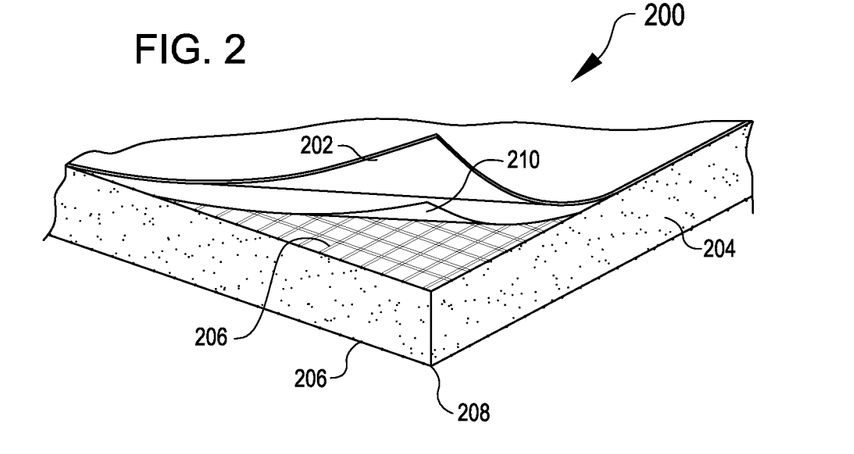
FIG. 2 illustrates a cross-section view of a non-wicking underlayment board including an impervious barrier layer for preventing moisture transfer across the underlayment board.

FIG. 2 illustrates a cross-section view of a non-wicking underlayment board 200 including an impervious barrier layer 210 for preventing moisture transfer across the underlayment board. The non-wicking underlayment board 200 includes a first outer facing 202 which may be identical to the first outer facing 102 as well as a foam core 204 and a second outer facing 208 that may both be identical to the foam core 104 and the second outer facing 108. For applications requiring extremely low permeability, such as in steam showers, the reinforcement layer 206 may be similar to the reinforcement layer 106 or may also include an impervious barrier layer 210.

The impervious barrier layer 210 may include a thin polyester or similar type film compatible with the underlying foam core 204. The impervious barrier layer 210 may be positioned between the first outer facing 202 and the foam core 204. The impervious barrier layer is preferably positioned between the reinforcement layer 206 and the first outer facing 202 such that the reinforcement layer 206 may still be encapsulated within the foam core 204.

Figure 3:
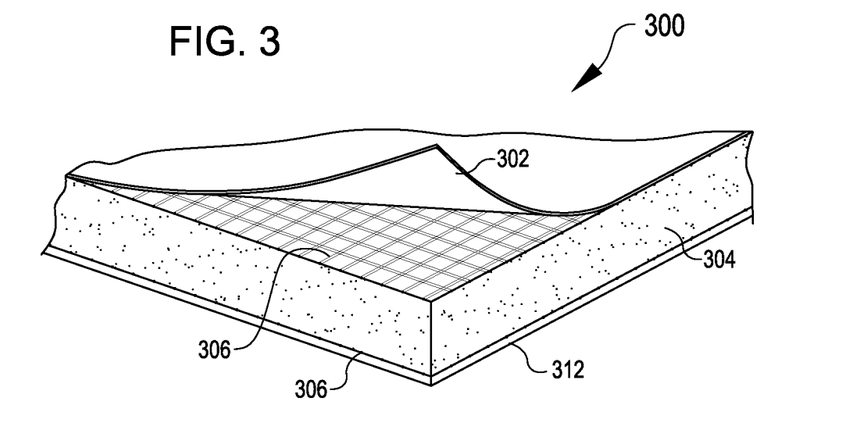
FIG. 3 illustrates a cross-section view of a non-wicking underlayment board including a crack or movement isolation layer.

FIG. 3 illustrates a cross-section view of a non-wicking underlayment board 300 including a crack or movement isolation layer 312. The non-wicking underlayment board 300 may be substantially similar to the non-wicking underlayment boards 100 and 200 described with respect to FIGS. 1 and 2 and include a first outer facing 302, reinforcement layers 306, foam core 304 all identical to the components shown and described with respect to FIGS. 1 and 2.

Applications requiring crack resistance for tile installations will require one side of the non-wicking underlayment board 300 to be faced with a thicker polymeric fiber nonwoven to isolate the underlying slab or subfloor movement from the overlaying tile or applied surface. The movement isolation layer 312 may prevent damage or transferal of motion or swelling from the underlying surface through to the applied layer of tile, cladding, or other material. The movement isolation layer 312 has a thickness of greater than 0.3 mm, such that the movement isolation layer 312 is able to prevent transferring motion, cracks, or changes in the shape of the supporting surfaces, to a certain degree, to prevent damage to the applied cladding. The waterproofing characteristics of the non-wicking underlayment board 300 are achieved with the first outer facing 302. In some examples, an impervious barrier layer may be included between the first outer facing 302 and the reinforcement layer 306. When installed, the movement isolation layer 312 is installed facing the substrate, such as a slab, floor joist, wall studs, and other such supporting surfaces. Both the first outer facing 302 and the movement isolation layer 312 are compatible with cementitious and non-cementitious mortars, sealants, and fasteners used to install boards in residential and commercial construction.

As with the embodiments described with respect to FIGS. 1 and 2, the non-wicking functionality is achieved through the use of the lightweight nonwoven material of the outer facings and the thin coating on the same. When installed, the non-wicking outer facings absorb some moisture to ensure good bonding strength with all types of mortars and adhesives but not enough water to promote wicking across the underlayment board.

FIGS. 4 and 5 depict environments where the non-wicking underlayment boards as described in any of the embodiments herein may be use in constructing moisture resistant or waterproof barriers.

FIG. 4 depicts an installation of a shower stall 400 showing different layers of the installation including non-wicking underlayment boards 402. The non-wicking underlayment boards 402 are used to cover walls as well as the floor and the curb 416 of the shower stall 400 installation.

The walls of the shower stall 400 have been faced with non-wicking underlayment boards 402. The non-wicking underlayment boards 402 are secured directly to studs within the wall without the need to apply over another surface or to apply a waterproof coating over the top of the non-wicking underlayment board 402. The non-wicking underlayment boards 402 are shown with exposed fasteners 406 because the properties of the non-wicking underlayment board including the closed cell foam and the outer facings are self-sealing when using typical fasteners, such as screws. Adjacent non-wicking underlayment boards 402 abut one another without any gap left between them and seam tape 404 is applied to cover the seams between the boards. The seam tape may be any seam tape as described herein. In some embodiments, the seam tape includes a non-woven backing that is capable of bonding with a mortar or other adhesive 408 used to secure the tiles 410 to the walls.

The drain 414 in shower stall 400 is centered within the shower stall 400 however, some embodiments may accommodate many different drain positions. In this example, a round drain cover will be used, but square drain covers or covers of other shapes may be used in other embodiments.

Non-wicking underlayment boards 412 (sloped ¼" per foot or more) are shown forming the shower pan of the shower stall 400. The non-wicking underlayment boards are resting on floor joists and are adhered and/or fastened to subfloor may include shim or space material to provide a slope towards the drain 414. In some embodiments, a shower stall 400 may be installed over a concrete or other kind of floor, for example using a non-wicking underlayment board 300 as described with respect to FIG. 3 that is capable of isolating cracks in the concrete under the floor.

The floor area of shower stall 400 is conceptually divided into four regions, defined by the outer walls of shower stall 400 and by diagonal lines emanating from drain 414 towards the corners of the shower stall 400. Each of the four regions slopes towards the drain 414, and the slope may be accomplished by placing shims or using a shaped or sloped non-wicking underlayment board, such as one that is specially shaped with a wedge-shape and sloped to allow simple installation of shower pans. The seams are once again covered by the seam tape as described above.

Adjacent the shower pan, a curb 416 is installed to prevent water from flowing out of the shower region into a remainder of the interior space. The curb 416 is formed of one or more pieces of non-wicking underlayment boards. In one example, the curb 416 may have a thickness of up to four inches. A four inch thick non-wicking underlayment board may be cut to the desired length and width to produce the curb 416. Tiles may be adhered directly to the curb 416 rather than having to build a curb structure first, then waterproof the structure as is typically done. In some embodiments, the non-wicking underlayment used to form the curb 416 may be formed into a shape designed for curbs 416 rather than in a large sheet. The material may be formed with a near square cross section or such that the thickness and the width of the material are of approximately the same scale. The material used to form the curb 416, and indeed any non-wicking underlayment board described herein, may include additional outer facings on sides perpendicular to the first outer facing and the second outer facing. In this way, the curb 416 may have an outer facing compatible with a thin set mortar or other adhesive on all surfaces of the curb 416 such that installation of the curb simple requires cutting the material to length and applying adhesive and tile to the curb material.

In some examples, a curbless shower stall may be installed using the non-wicking underlayment board. A low-profile wedge that has a ⅛ inch thickness at one end and a ½ inch thickness at the other end. The surrounding area outside the shower pan may also be formed of ½ inch non-wicking underlayment board such that water within the region of the shower drains to the center of the shower pan. In some examples, the surrounding area outside the shower pan may be raised above the shower pan by around ½ inch through the use of additional or thicker subfloor in the surrounding area. This enables the use of a curbless shower stall that allows water to drain to the center of the shower pan.

Though described above with respect to the curb 416, the non-wicking underlayment board described herein may also be used to build other waterproof structures, such as shower benches, shelves, or other such features within the shower stall 400.

FIG. 5 illustrates an example exterior wall panel 500 installation using a non-wicking underlayment board 502. In the exterior wall panel 500, studs 506 and structural elements of the wall are shown at one end of the exterior wall panel 500 for purposes of illustrating that the non-wicking underlayment board 502 can be secured directly to the structure of the wall and a decorative stone 514 or other cladding can be applied directly to the non-wicking underlayment board 502. A window 504 can be accommodated by cutting the non-wicking underlayment boards 502 into the proper size to leave a window opening. In this embodiment, the non-wicking underlayment board serves as a shear panel and replaces the need to install sheathing to an exterior followed by a waterproof surface and followed by an adhesive compatible surface as is typically done. Though a decorative stone 514 is shown in the figure, adhered with a thin set mortar 512 compatible with the outer facing of the non-wicking underlayment board 502, other claddings can be installed including lap siding, stucco, coatings, tile, or any other suitable exterior wall facing material.

The non-wicking underlayment boards 502 are tightly jointed together, as would not be possible with typical materials due to moisture wicking that would occur at the joints. A seam tape 508 is applied over the joints to increase the waterproofing of the surface, the seam tape 508 preferably including a nonwoven fiber backing for compatibility with the thin set mortar 512 or other adhesive.

The use of the non-wicking underlayment board 502 in an exterior application substantially decreases the installation time for wall facing material. The non-wicking underlayment board 502 can be secured directly to the structure of the wall, such as studs 506 with mechanical fasteners, i.e., screws, and as described above with respect to FIG. 4, the material is self-sealing around the fasteners so seam tapes 508 can be applied immediately. Peel and stick seam tapes with nonwoven fiber backings adhere immediately and provide a surface to which the exterior facing, such as the decorative stone 514 can be applied without the need to wait for any previous work to dry or be waterproofed. As such, installation of exterior walls is substantially sped up by significantly reducing the number of required disparate elements and eliminating the need to wait for previous elements to dry or set before proceeding.

The invention has now been described in detail for the purposes of clarity and understanding. However, those skilled in the art will appreciate that certain changes and modifications may be practiced within the scope of the appended claims. It is to be understood that any workable combination of the features and capabilities disclosed above in the various embodiments is also considered to be disclosed.

What is claimed is:

1. A non-wicking underlayment board, comprising:
    a foam core layer having a compressive strength greater than twenty pounds per square inch along a thickness of the foam core layer, wherein the thickness is in a range of between 3.175 mm (⅛ inch) to 101.6 mm (4 inches);
    a reinforcement layer coextensive with the foam core layer and integrally formed within the foam core layer;
    a first and second polyester low-wick outer facing layer coextensive with and positioned on opposite faces of the foam core layer, each comprising mineral-coated nonwoven fibers and having a thickness in a range of between 0.15 mm (0.0059 inches) to 0.3 mm (0.0118 inches), wherein:
        the mineral-coated nonwoven fibers prevent wicking of liquid;
        the mineral-coated nonwoven fibers are coated with a mineral-based coating is applied at a rate of between about 4 grams per square foot and 10 grams per square foot; and
        the reinforcement layer is bonded to one of the first and second polyester low-wick outer facing layer using an acrylic adhesive; and
    an impervious layer disposed between and adjacent to the reinforcement layer and the first polyester low-wick outer facing layer, wherein the impervious layer comprises a polyester film or a polyethylene terephthalate (PET) film having a thickness less than 0.3 mm.

2. The non-wicking underlayment board of claim 1, wherein the foam core layer comprises a closed cell foam having a compressive strength greater than two hundred and fifty pounds per square inch.

3. The non-wicking underlayment board of claim 1, wherein the foam core layer comprises a polyisocyanurate foam, a polystyrene foam, or a polyurethane foam.

4. The non-wicking underlayment board of claim 1, wherein each of the first and second polyester low-wick outer facing layer is glass-free.

5. The non-wicking underlayment board of claim 1, wherein the reinforcement layer comprises a fiberglass scrim.

6. The non-wicking underlayment board of claim 1, wherein the non-wicking underlayment board is self-sealing when punctured by a fastener.

7. The non-wicking underlayment board of claim 1, wherein the non-wicking underlayment board resists twenty-four inches of hydrostatic pressure for a time period of forty-eight hours.

8. The non-wicking underlayment board of claim 1, further comprising an additional impervious layer positioned between the foam core layer and the second low-wick outer facing layer.

9. A non-wicking underlayment board, comprising:
    a foam core layer having a compressive strength greater than twenty pounds per square inch along a thickness of the foam core layer, wherein the thickness is in a range of between 3.175 mm (⅛ inch) to 101.6 mm (4 inches);
    a reinforcement layer coextensive with the foam core layer and integrally formed within the foam core layer;
    a first polyester outer facing layer coextensive with and positioned on a first face of the foam core layer, the first outer facing layer comprising mineral-coated nonwoven fibers and having a thickness in a range of between 0.15 mm (0.0059 inches) to 0.3 mm (0.0118 inches), wherein:
        the mineral-coated nonwoven fibers prevent wicking of liquid;
        the mineral-coated nonwoven fibers of the first polyester outer facing layer are coated with a mineral-based coating that is applied at a rate of between about 4 grams per square foot and 10 grams per square foot; and
        the reinforcement layer is bonded to the first polyester outer facing layer using an acrylic adhesive; and
    a second polyester outer facing layer coextensive with and positioned on a second face of the foam core layer, the second polyester outer facing layer comprising mineral-coated nonwoven fibers and having a thickness of greater than 0.3 mm (0.118 inches), wherein:

a thickness of the foam core layer varies across a length of the foam core layer such that the first polyester outer facing layer and the second polyester outer facing layer are angled relative to one another; and the mineral-coated nonwoven fibers of the second polyester outer facing layer are coated with the mineral-based coating that is applied at a rate of between about 4 grams per square foot and 10 grams per square foot.

10. The non-wicking underlayment board of claim 9, wherein the second polyester outer facing layer is configured for isolating movement adjacent the second outer facing layer.

11. The non-wicking underlayment board of claim 9, wherein the thickness of the foam core layer varies across the length by at least 0.25 inches per foot.

12. The non-wicking underlayment board of claim 9, further comprising an impervious layer positioned between the foam core layer and at least one of the first polyester outer facing layer or the second polyester outer facing layer.

13. The non-wicking underlayment board of claim 12, wherein the impervious layer comprises a polyester film or a polyethylene terephthalate (PET) film having a thickness less than 0.3 mm.

\* \* \* \* \*